(12) United States Patent
Suzuki (10) Patent No.: US 7,839,996 B2
(45) Date of Patent: Nov. 23, 2010

(54) FOLDING ELECTRONIC DEVICE, CONNECTING COMPONENT AND CAMERA UNIT

(75) Inventor: Yasuhiro Suzuki, Shizuoka (JP)

(73) Assignee: NEC Corporation, Tokyo (JP)

( * ) Notice: Subject to any disclaimer, the term of this patent is extended or adjusted under 35 U.S.C. 154(b) by 983 days.

(21) Appl. No.: 11/230,637

(22) Filed: Sep. 21, 2005

(65) Prior Publication Data

US 2006/0101772 A1 May 18, 2006

(30) Foreign Application Priority Data

Sep. 24, 2004 (JP) ............................. 2004-276920

(51) Int. Cl.
H04M 1/00 (2006.01)
H04M 9/00 (2006.01)

(52) U.S. Cl. ................................................ 379/433.13

(58) Field of Classification Search ............ 379/433.01, 379/433.11, 433.13; 455/556.1, 566, 575.1, 455/575.3

See application file for complete search history.

(56) References Cited

U.S. PATENT DOCUMENTS

| | | | | |
|---|---|---|---|---|
| 6,396,924 | B1 * | 5/2002 | Suso et al. | 379/433.13 |
| 6,704,586 | B2 * | 3/2004 | Park | 455/575.3 |
| 6,708,046 | B1 | 3/2004 | Takagi | |
| 6,829,490 | B2 * | 12/2004 | Nakamura et al. | 455/550.1 |
| 6,865,406 | B2 * | 3/2005 | Park | 455/575.3 |
| 6,879,337 | B2 * | 4/2005 | Tatehana et al. | 348/14.02 |
| 6,882,726 | B2 * | 4/2005 | Kim | 379/433.13 |
| 6,957,083 | B2 | 10/2005 | Ikeda et al. | |
| 7,046,204 | B2 | 5/2006 | Satoh et al. | |
| 7,055,219 | B2 * | 6/2006 | Shiba | 16/367 |
| 7,133,691 | B2 * | 11/2006 | Kang | 455/556.1 |
| 7,146,200 | B2 * | 12/2006 | Park et al. | 455/575.3 |
| 7,184,092 | B2 | 2/2007 | Lim | |
| 7,218,732 | B2 * | 5/2007 | Tanaka et al. | 379/433.13 |
| 7,392,071 | B2 * | 6/2008 | Pan | 455/575.1 |
| 7,392,072 | B2 * | 6/2008 | Im | 455/575.3 |
| 7,424,214 | B2 * | 9/2008 | Kim et al. | 396/72 |
| 2002/0187818 | A1 | 12/2002 | Kang | |
| 2004/0075620 | A1 | 4/2004 | Tanaka et al. | |
| 2004/0204064 | A1 | 10/2004 | Ikeda et al. | |
| 2005/0287953 | A1 | 12/2005 | Ikeda et al. | |

FOREIGN PATENT DOCUMENTS

| | | |
|---|---|---|
| CN | 1502171 A | 6/2004 |
| EP | 1 267 576 A2 | 12/2002 |
| EP | 1 416 781 A1 | 5/2004 |
| JP | 2000-269662 A | 9/2000 |
| JP | 2003-060764 A | 2/2003 |

(Continued)

*Primary Examiner*—Fan Tsang
*Assistant Examiner*—Phylesha Dabney
(74) *Attorney, Agent, or Firm*—Foley & Lardner LLP (57) ABSTRACT

A folding electronic device has a first frame having plural first joints, a second frame having plural second joints, plural sets of hinge joints in which the plural first joints and the plural second joints are connected together in a manner that the first frame and the second frame can rotate on a predetermined rotation axis, a first body containing the first frame, and a second body containing the second frame, wherein at least one set of hinge joint of the plural sets of hinge joints has a connecting component having a hollow portion and wherein the other sets of hinge joints have predetermined solid hinge shafts.

16 Claims, 10 Drawing Sheets

FOREIGN PATENT DOCUMENTS

| | | |
|---|---|---|
| JP | 2003-229941 A | 8/2003 |
| JP | 2004-015798 A | 1/2004 |
| JP | 2004-104164 A | 4/2004 |
| JP | 2004-104164 A | 4/2004 |
| JP | 2004-112560 A | 4/2004 |
| WO | WO 02/082674 A1 | 10/2002 |
| WO | WO 2004/034681 | 4/2004 |

\* cited by examiner

OPEN STATE

CLOSED STATE

OPEN STATE  FLEXIBLE BOARD REFERENCE POSITION  CLOSED STATE

FIG.11A  PHOTOGRAPHING DIRECTION: 0°

FIG.11B  PHOTOGRAPHING DIRECTION: 270°

FOLDING ELECTRONIC DEVICE, CONNECTING COMPONENT AND CAMERA UNIT

BACKGROUND OF THE INVENTION

1. Field of the Invention

The present invention relates to a folding electronic device and, more particularly, to a folding electronic device whose hinge is equipped with a hollow portion. And the present invention also relates to a connecting component which has a hollow portion and a camera unit which can be built-in rotatably.

2. Description of the Related Art

For the following description, some of the main terms used therein will be first defined as follows: A "hinge portion" refers to a fulcrum portion for folding an electronic device. A "joint" refers to a portion of each of two bodies jointed together at the "hinge portion". A "hinge joint" refers to a set of two "joints" jointed together. A "hinge shaft" refers to a portion working as a rotation axis in a "hinge joint". One "hinge portion" is equipped with one or more "hinge joints", and one "hinge joint" is equipped with one "hinge shaft". In some cases, one "hinge shaft" is used as a rotation axis common to some of "hinge joints". Each of the bodies connected together is equipped with one or more "joints".

In some folding mobile phones, a small camera is rotatably built into the hinge portion (See JP 2004-104164 A). In such a folding mobile phone, it is possible to direct the small camera to an object behind the phone, with the mobile phone open, and to photograph the object while checking the object on the LCD of the phone. Further, when the small camera points at the side of the LCD, it is possible for the user to photograph himself. Thus, with this mobile phone, it is possible for the user to photograph himself by the small camera while talking over the phone, and to display an image of the person to whom he is talking to on the LCD, and to use the mobile phone as a videophone. The demand for this type of mobile phone is expected to increase.

As shown in JP 2004-104164 A, an ordinary folding mobile phone has some hinge joints for connecting the upper body and the lower body to each other at either end of the hinge portion. Each of the two hinge joints is equipped with a hinge shaft working as the rotation axis for folding.

A flexible board and a coaxial cable for electrical connection between the upper body side and the lower body side are installed in an open space and avoid the hinge shafts in the hinge joints. A camera unit is installed in between the two hinge joints.

As mobile phones become smaller and thinner, the size of the hinge joints and the open space near the hinge shafts in the hinge joints become smaller. As a result, no space is available for the installation of the wiring board and the cable, and there is nothing for it but to use the space between the two hinge joints as the wiring space. This makes it difficult to install the camera unit in the space.

To solve this problem, JP 2003-60764 A discloses a solution that the hinge shaft is installed solely in one of the hinge joints at both ends of the hinge portion. No hinge shaft as a component is used in the other hinge joint, and the two bodies are directly jointed to each other without hinge shafts. The inside of the hinge joint using no hinge shaft is hollow and the space is used for passing the flexible board, etc. As a result, it is possible to secure the space for installing the camera unit between the two hinge joints.

However, in the solution shown in JP 2003-60764 A, in which the number of hinge shafts is reduced from two to one, load is concentrated on the portion of the hinge joint supporting the hinge shaft. Further, the hinge joint using no hinge shaft component is hollow and has rather low mechanical strength. Thus, there is the possibility of the hinge shaft supporting portion of one hinge joint and the hollow portion of the other hinge joint suffering damage, resulting in detachment of the camera unit.

SUMMARY OF THE INVENTION

The present invention was made to solve the foregoing and other exemplary problems, drawbacks, and disadvantages of the conventional structures.

In view of the problems, drawbacks, and disadvantages, the first exemplary feature of the present invention is to provide a folding electronic device in which the rigidity of a hinge portion connecting an upper body and a lower body is enhanced and in which some of hinge joints are equipped with hollow components.

The second exemplary feature of the present invention is to provide a component connecting two frames in which electrical wiring can pass through.

The third exemplary feature of the present invention is to provide a camera unit which can be built-in rotatably between hinge joints.

In an exemplary embodiment of the present invention to attain the object, a folding electronic device has a first frame having plural first joints, a second frame having plural second joints, plural sets of hinge joints in which the plural first joints and the plural second joints are connected together in a manner that the first frame and the second frame can rotate on a predetermined rotation axis, a first body containing the first frame, and a second body containing the second frame, wherein at least one set of hinge joint of the plural sets of hinge joints has a connecting component having a hollow portion and wherein the other sets of hinge joints have predetermined solid hinge shafts.

In the folding electronic device of the present invention, the upper body and the lower body contain a frame equipped with a joint, and thereby the rigidity of the hinge joints enhances and the hinge joints are not easily damaged. Thus, hollow joint components can be used in some of the hinge joints. As a result, a flexible board, etc. for electrical connection between the upper body side and the lower body side can be passed through this hollow components, so that the open space near the hinge joints, e.g., the open space between the hinge joints increases.

In an exemplary embodiment of the present invention to attain the second object, a connecting component, which has a predetermined hollow portion and a gap for allowing passage of predetermined electrical wiring provided in a side surface of the predetermined hollow portion, connects rotatably two frames equipped with predetermined joints.

The connecting component of the present invention has a hollow portion and a gap in the side, and thereby some electrical wires can pass through in it.

In an exemplary embodiment of the present invention to attain the third object, a camera unit, which has electrical wiring connected to a predetermined circuit board in a first frame or a second frame after making one round or more, is rotatably built-in between two sets of adjacent hinge joints of plural hinge joints connecting the first frame and the second frame.

The camera unit has electrical wiring one round or more, and thereby it can be built-in between the hinge joints rotatably.

As described above, if further reduced in size, the folding electronic device of the present invention can secure the space for installing a camera unit, etc. in the hinge portion. The connecting components can pass through some electrical wires in it, so it is useful for reduction of the size of a device of which bodies are connected with the connecting component. And the camera unit can be built-in rotatably between the hinge joints of the device.

BRIEF DESCRIPTION OF THE DRAWINGS

The above and other objects, features and advantages of the present invention will become more apparent form the following detailed description when taken in conjunction with the accompanying drawings wherein:

FIGS. 5A and 5B are side sectional views taken along a line B-B of FIG. 4.

FIGS. 6A, 6B, and 6C are side sectional views taken along a line A-A of FIG. 1.

FIG. 10A and FIG. 10B is a perspective view showing the positional relationship between a camera unit and an upper case when the camera unit is built into the upper case on the lower body side of FIG. 1. Unlike FIG. 9A.

FIGS. 11A and 11B are see-through views, as seen from sideways, of a protrusion of each of the camera joint plate and upper case of the lower body, for illustration of the rotation range of the camera unit of FIG. 1.

DESCRIPTION OF THE EXEMPLARY EMBODIMENTS

Figure 1:
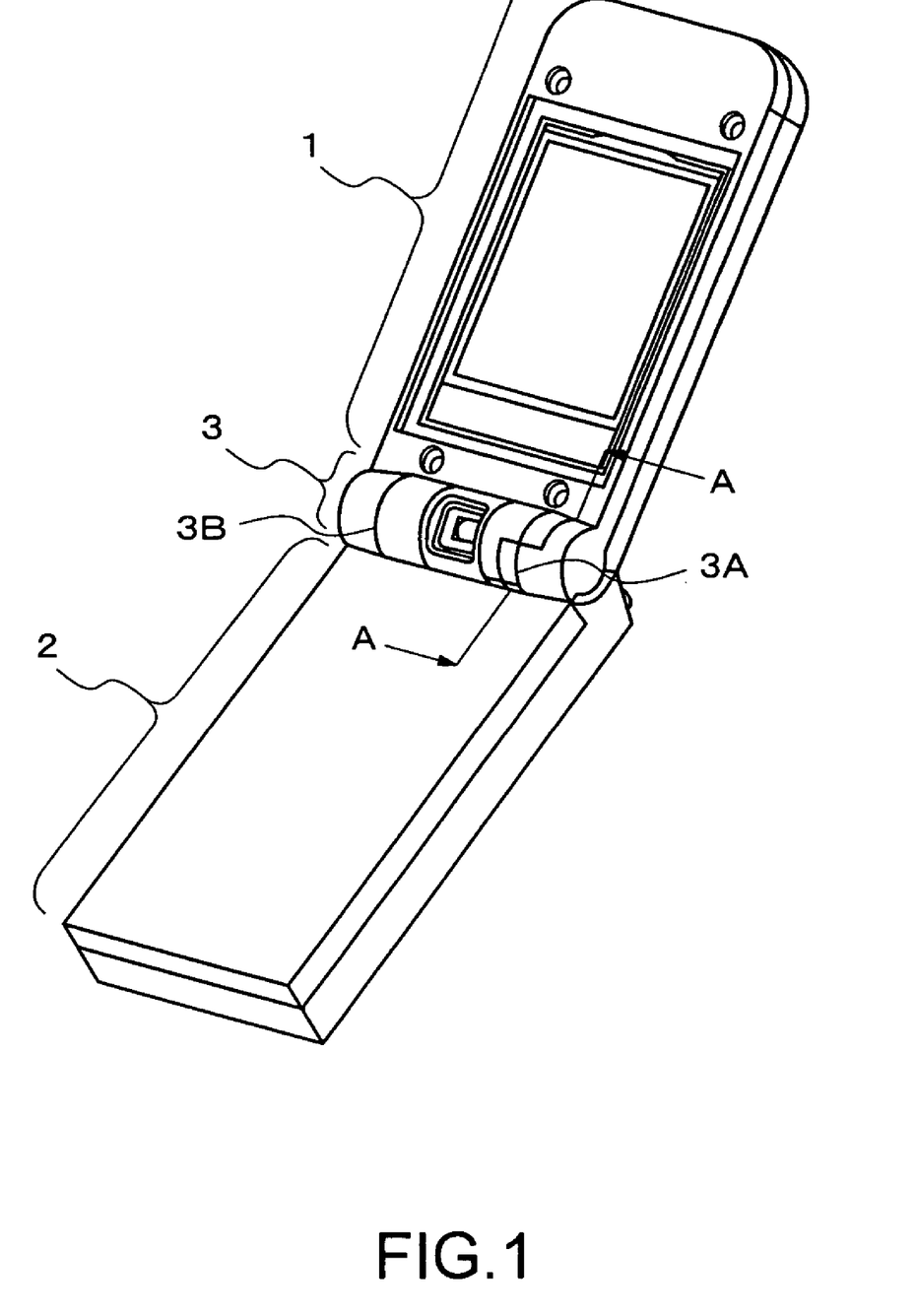
FIG. 1 is an outward view of a folding electronic device according to an embodiment of the present invention.
Figure 2:
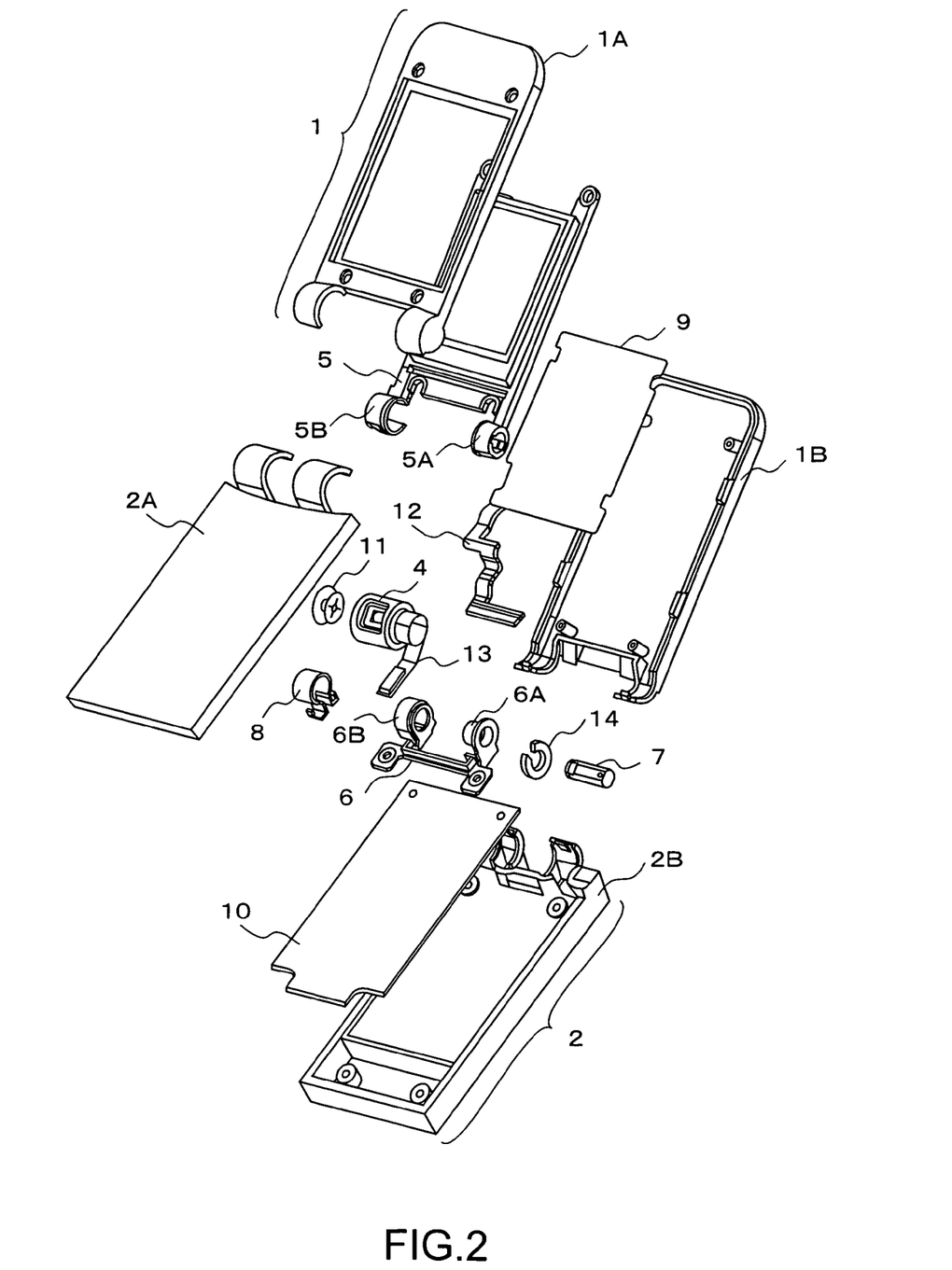
FIG. 2 is an exploded view of the folding electronic device shown in FIG. 1.

FIG. 1 is an outward view of the folding mobile electronic device of this embodiment, and FIG. 2 is an exploded view of the folding electronic device shown in FIG. 1.

As shown in FIG. 1, this folding mobile electronic device comprises an upper body (first body) 1, a lower body (second body) 2, and a hinge portion 3 rotatably connecting these. The hinge portion 3 of this mobile electronic device is equipped with two sets of hinge joints 3A and 3B.

As shown in FIG. 2, the case of the upper body 1 is composed of an upper case 1A and a lower case 1B. And an LCD (Liquid Crystal Display) 9 and a first frame 5 retaining the upper case 1A, the lower case 1B and the LCD 9 are built in between the upper case 1A and the lower case 1B. The case of the lower body 2 is composed of an upper case 2A and a lower case 2B. A second frame 6 connected to the first frame 5 and a circuit board 10 are built in between the upper case 2A and the lower case 2B.

The hinge joint 3A and the hinge joint 3B joint the first frame 5 and the second frame 6, which are high rigidity mold components made of a magnesium alloy or the like. A metal hinge shaft 7 is used for the connection of the hinge joint 3A, and a plastic hollow component 8 is used for the connection of the hinge joint 3B. Further, at the central portion of the hinge portion 3, that is, between the hinge joint 3A and the hinge joint 3B, there is a built-in camera unit 4 that is rotatable around the central axis of the hinge shaft 7. The camera unit 4 is rotatable, so it is capable of photographing both the front side and the back side of this mobile electronic device.

The position of the hinge portion 3 in this folding mobile electronic device does not matter. The hinge portion 3 shown in FIG. 1 is at the end of the upper body 1 and the lower body 2. But the hinge portion 3 doesn't have to be at the end of the upper body 1 or the lower body 2.

It does not matter which of the hinge joint 3A and the hinge joint 3B, shown in FIG. 1, comes on the right-hand side or the left-hand side; their positions are interchangeable.

Further, the material of the first frames 5 and the second frame 6 is not restricted to a magnesium alloy; it is also possible to use some other material as long as it is a high rigidity mold material. The material of the hollow component 8 is not restricted to plastic, either; it may also be metals or some other material.

The LCD 9 and the circuit board 10 are electrically connected to each other by using a flexible board 12 as an electrical wiring cable. The flexible board 12 passes through the hollow component 8. The electrical wiring cable is not restricted to a flexible board; it may also be an ordinary cable whose conductor is coated with an insulator.

Figure 3:
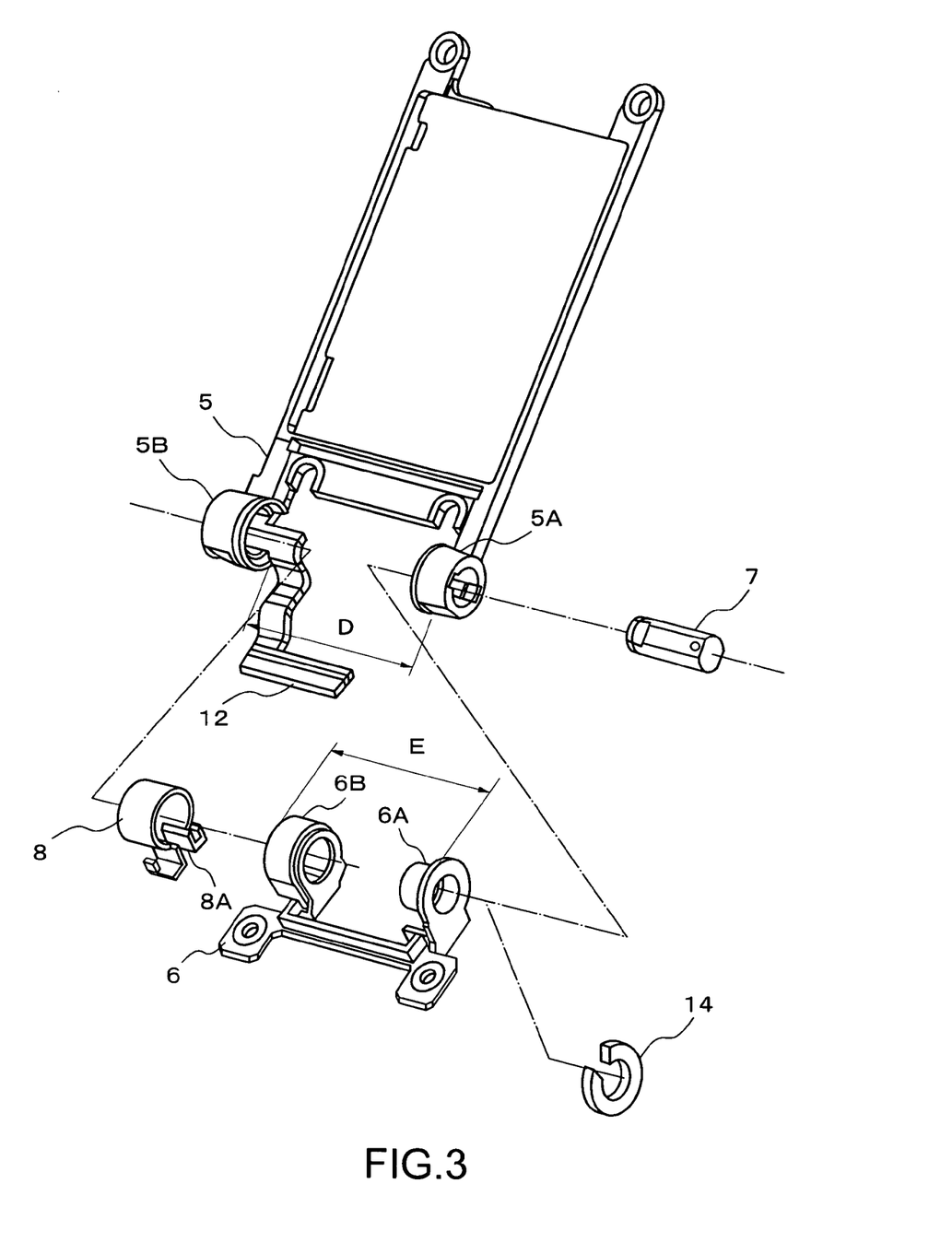
FIG. 3 is an exploded perspective view showing components forming the hinge portion of FIG. 1.

Next, referring to FIG. 3, a method of connecting the hinge joints 3A and 3B will be described. A first joint 5A and a second joint 6A are connected with each other to form the hinge joint 3A. A first joint 5B and a second joint 6B are connected with each other to form the hinge joint 3B.

First, the second frame 6, to which the hollow component 8 is built in, is connected to the first frame 5 to which the flexible board 12 is built in. The hollow component 8 is built into the first joint 5B and the second joint 6B as the rotation axis of the hinge joint 3B. The first joint 5B and the second joint 6B are connected so as to be aligned with the rotation axis of the hinge portion 3, that is, the central axis of the hinge shaft 7.

When connecting the first joint 5B and the second joint 6B with each other, the second frame 6 is connected to the first frame 5 while being slid along the rotation axis of the hinge portion 3 such that the hollow component 8 is inserted into the second joint 5B. Thus, the distance D between the first joint 5A and the first joint 5B is larger than the distance E between the second joint 6A and the second joint 6B by a length corresponding to the sliding of the second frame 6.

When the first joint 5B and the second joint 6B are connected together by the hollow component 8, a gap corresponding to the sliding of the second frame 6 is generated between the first joint 5A and the second joint 6A. Thus, a C-shaped spacer 14 is inserted into this gap to fill it.

Finally, when the hinge shaft 7 is inserted into the first joint 5A and the second joint 6A, the hinge joint 3A is completed.

When connecting the first frame 5 and the second frame 6 through sliding, the flexible board 12 is inserted into a slit 8A provided in the hollow component 8. The slit 8A is a gap of a size large enough to allow insertion of the flexible board 12 as the electrical wiring. When an ordinary cable is used as the electrical wiring, a gap large enough to allow insertion of that cable is provided.

Next, the behavior of the hinge portion 3 of this folding electronic device when it opens and closes will be described. The folding angle of the hinge portion 3, that is, the angle made by the first frame 5 and the second frame 6, can be varied within a predetermined range. The state in which the folding angle is maximum, that is, the state where this folding electronic device is completely opened and straightened, will be referred to as the "open state". The state where this folding electronic device is completely closed will be referred to as the "closed state". When the open or closed state is approached through an opening or closing operation of the first frame 5 and the second frame 6, a torque causing switchover to either of the state is generated in the hinge portion 3. Immediately before the completion of switchover to the open state or the closed state, a click sound is generated. This switchover is affected in order to maintain this folding mobile electronic device in the open state or the closed state in a stable manner. For, it is to be expected that these two states most frequently occur as the folding states of this folding mobile electronic device in use.

Figure 4:
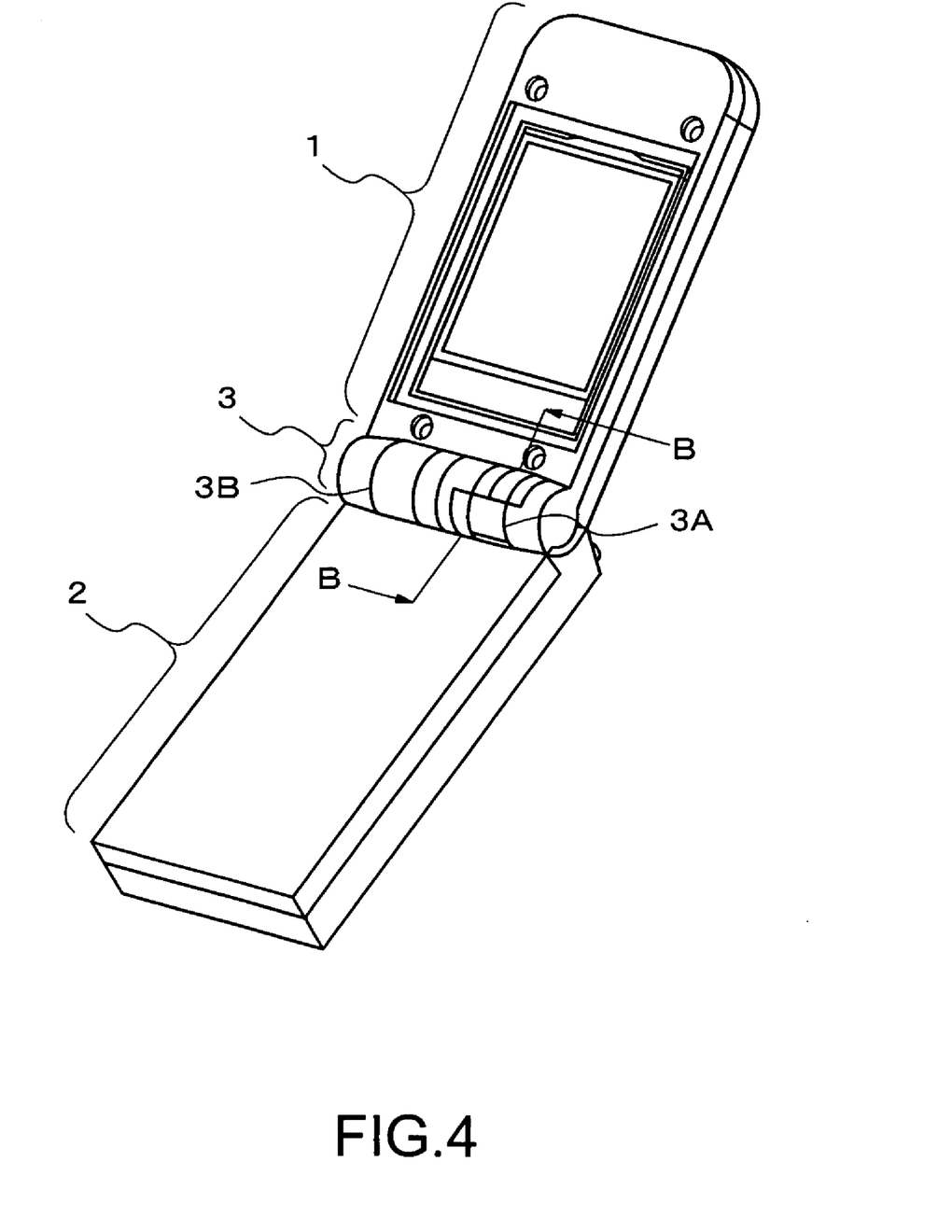
FIG. 4 is an outward view of an ordinary folding electronic device.

Next, referring to FIG. 1, FIG. 4, FIGS. 5A and 5B, and FIGS. 6A, 6B, and 6C, the behavior of the flexible board 12 when it opens and closes will be described. FIG. 4 is an outward view of an ordinary folding electronic device, FIGS. 5A and 5B are sectional views taken along a line B-B of FIG. 4, and FIGS. 6A, 6B, and 6C are sectional views taken along a line A-A of FIG. 1.

Figure 5A:
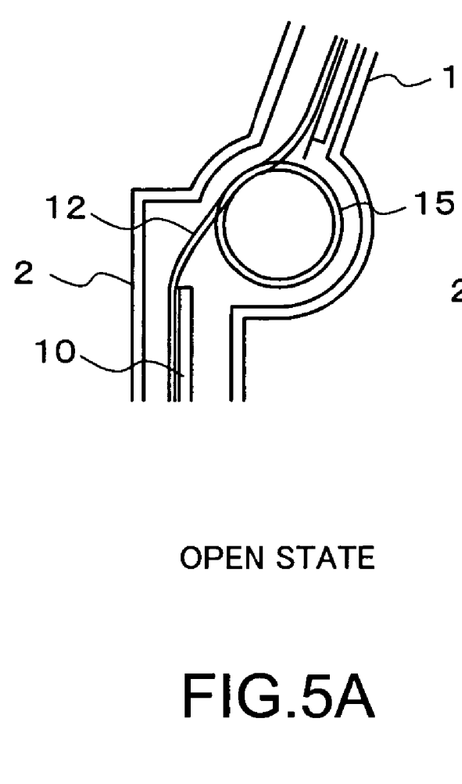
FIG. 5A is a sectional view showing the configuration of a flexible board when the folding mobile electronic device is open.
Figure 5B:
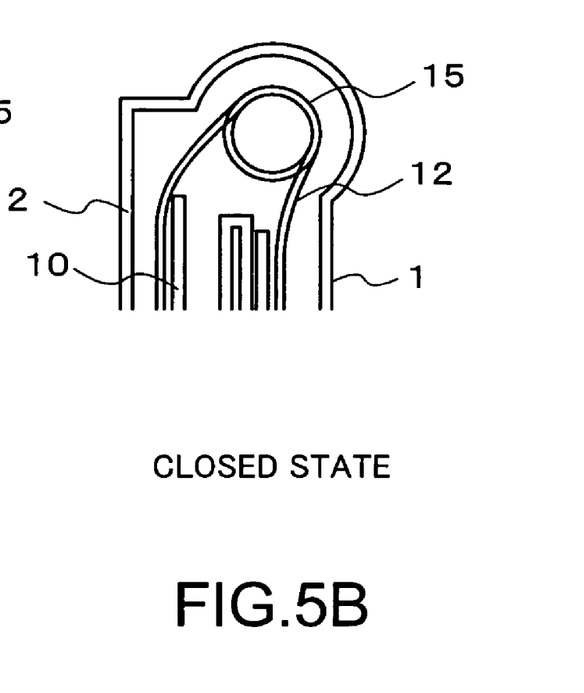
FIG. 5B is a sectional view of the flexible board when the folding mobile electronic device is closed.

FIGS. 5A and 5B show a generally adopted method in which the flexible board 12 is caused to make a turn within the cylindrical hinge portion 3 to be formed into a ring. In this method, the variation in the distance between the upper body 1 and the lower body 2 in the open state and the closed state is absorbed through an increase and decrease in the diameter of the curving portion 15 of the flexible board 12. The distance between the upper body 1 and the lower body 2 is smaller in the closed state than in the open state, so that, as shown in FIGS. 5A and 5B, the diameter of the curving portion 15 is smaller in the closed state.

Figures 6A, 6B:
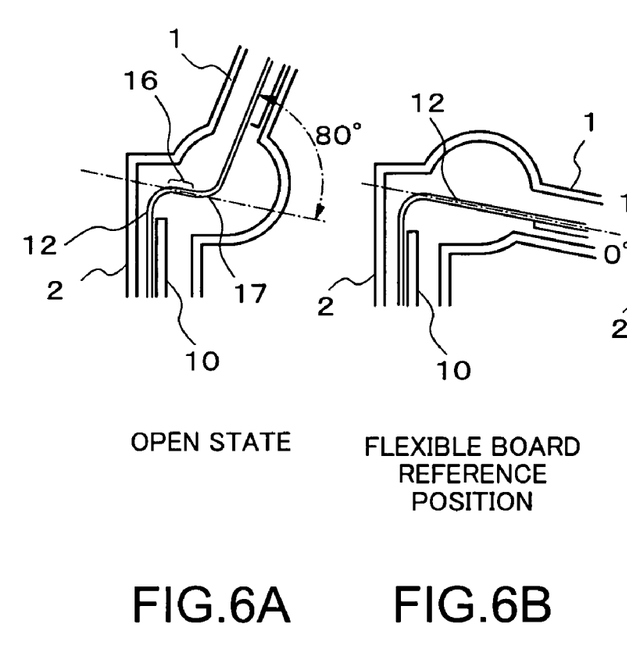
FIG. 6A is a sectional view showing the configuration of the flexible board when the folding mobile electronic device is completely open.
FIG. 6B is a sectional view showing the configuration of the flexible board when the folding mobile electronic device is exactly halfway between the open and the closed state.

In contrast, in this embodiment, when the mobile electronic device is in an intermediate state between the open state and the closed state (hereinafter referred to as the "intermediate state"), the flexible board 12 is flat within the hinge joint 3B. The curving position 17 in the intermediate state is the reference and the curving portions 17 of the flexible board 12 in the open state and the closed state are bent to opposite sides from each state. Suppose, for example, the angle made by the lower body 2 and the upper body 1 is 160 degrees. And, the state just halfway through, where the angle is 80 degrees, will be regarded as the intermediate state (FIG. 6B). Assuming that, in the intermediate state, the curving portion of the flexible board 12 is made flat, the curving portion 17 is bent in opposite directions by 80 degrees in the open state and the closed state (FIGS. 6A and 6C).

Figure 6C:
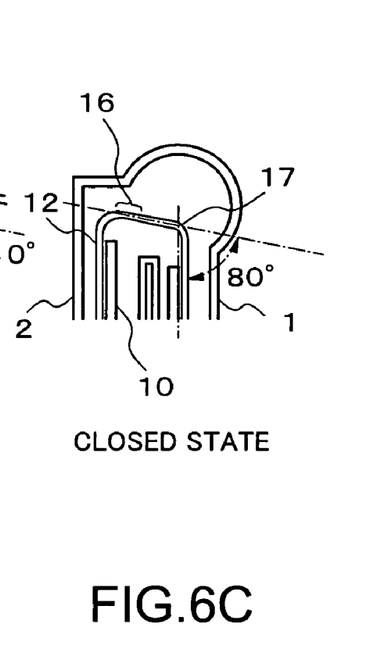
FIG. 6C is a sectional view showing the configuration of the flexible board when the folding mobile electronic device is in the closed state.

The flexible board 12 is curved in the manner as shown in FIGS. 6A, 6B, and 6C because it is supported so as not to be curved at the support portion 16 and is curved only at the curving portion 17. Near the support portion 16, the flexible board 12 passes through the slit 8A of the hollow component 8. Thus, when the flexible board 12 is curved, the flexible board 12 is supported so as to be flat by the surfaces on both sides of the slit 8A.

Also when an ordinary cable is used as the electrical wiring instead of the flexible board 12, it is supported by providing a gap in the hollow component 8 such that it is supported at the support portion 16 and is curved only at the curving portion 17. In the above description, the curving state in the intermediate state of the flexible board 12, which is of a flat configuration with a predetermined width, is expressed as "flat". In the case of an ordinary cable, it is "straight" in the intermediate state. Both adjectives "flat" and "straight" mean that the cable itself is not bent.

Figure 7:
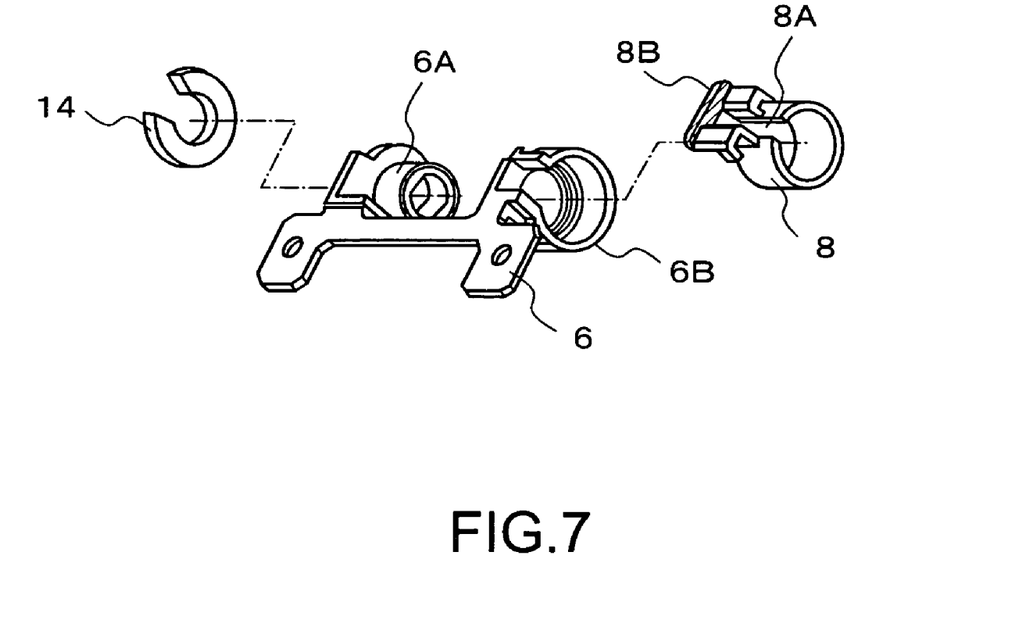
FIG. 7 is a diagram showing components forming a hinge joint according to an embodiment.
Figure 8:
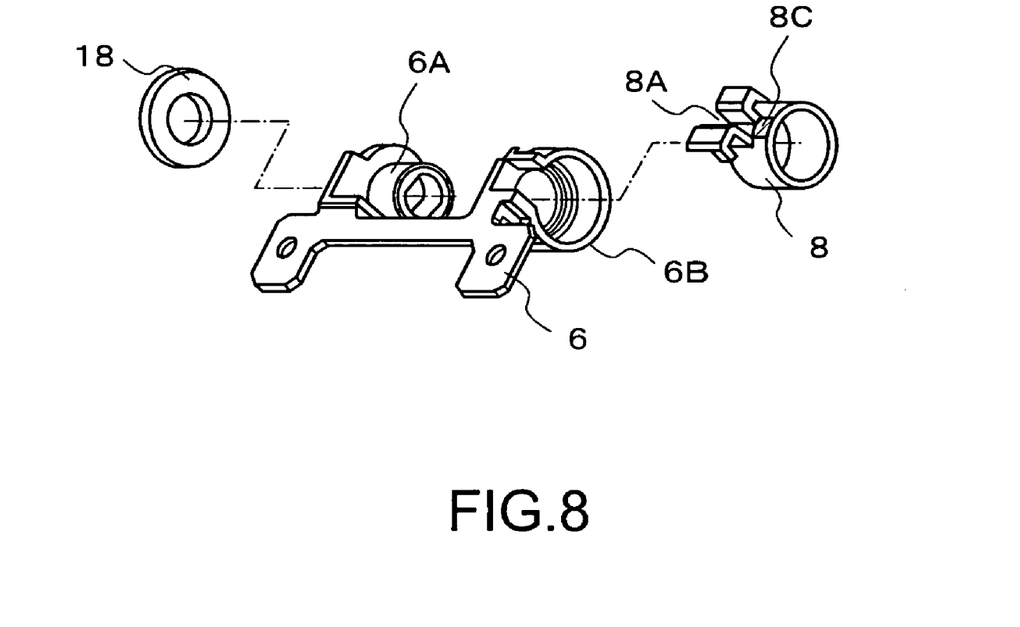
FIG. 8 is a diagram showing components forming a hinge joint according to another embodiment.

As shown in FIG. 7, in order to enhance the rigidity of the hollow component 8 in the direction perpendicular to the rotation axis and to keep the configuration of the hollow portion cylindrical, both ends of the slit 8A is connected by a slit joint 8B. Instead of the joint of the slit joint 8B shown in FIG. 7, it is also possible to form a slit joint 8C on the cylindrical portion of the hollow component 8 as shown in FIG. 8.

Further, as shown in FIG. 7, in this embodiment, the spacer 14 is formed in a C-shape so that it can be assembled to the hinge shaft 7 after the insertion of the hinge shaft 7 into the second joint 6A. Instead of this configuration, it is also possible to use, as shown in FIG. 8, a ring-shaped spacer 18. In this case, when the hinge shaft 7 is inserted into the second joint 6A, the hinge shaft 7 is simultaneously inserted into the spacer 18. The ring-shaped configuration of the spacer 18 is effective in that the spacer 18 is not detached from the hinge shaft 7.

While in this embodiment there are two hinge joints: the hinge joint 3A and the hinge joint 3B, the number of hinge joints may be three or more. When providing an additional hinge joint in the above embodiment, it is possible to use as the additional hinge joint a solid rotation axis component like the hinge shaft 7 or a component with a hollow portion like the hollow component 8.

Figure 9A:
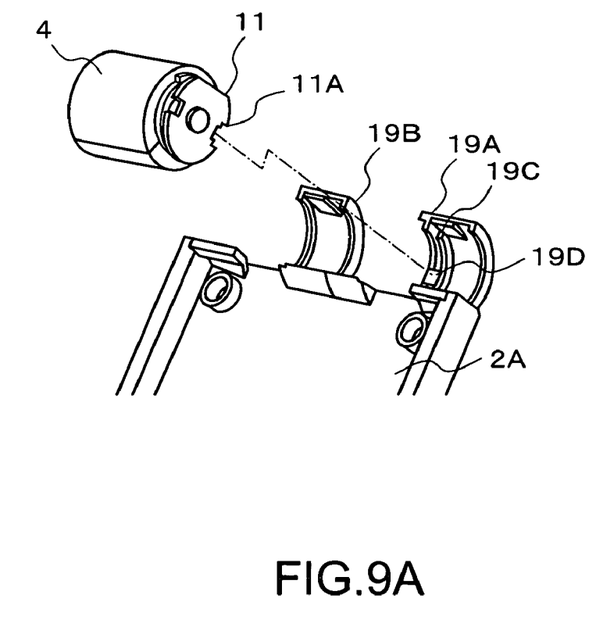
FIG. 9A is a perspective view showing the positional relationship between a camera unit and an upper case when the camera unit is built into the upper case on the lower body side of FIG. 1.
Figure 9B:
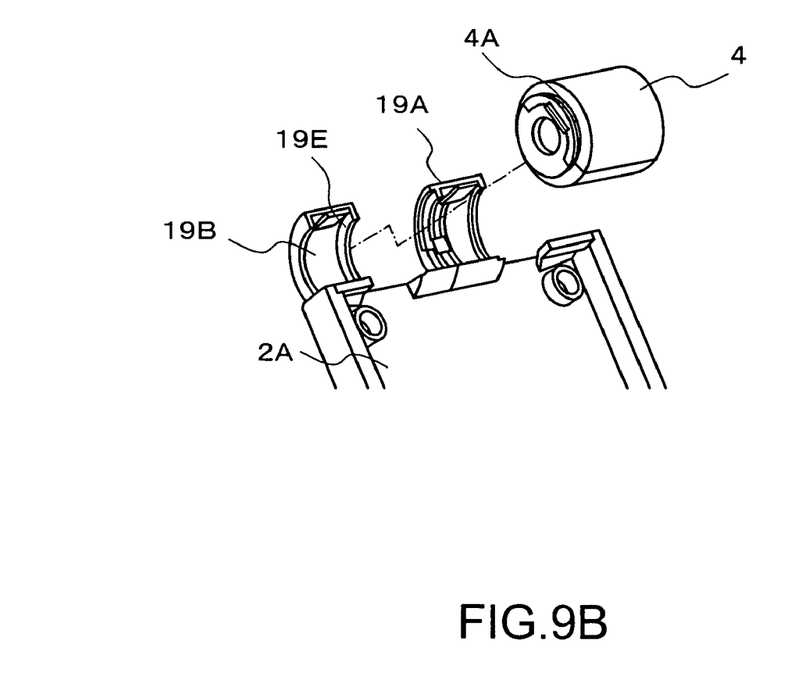
FIG. 9B is a perspective view showing the same thing as FIG. 9A as seen in the laterally opposite direction.

Next, the installing of the camera unit 4 will be described in detail. FIGS. 9A and 9B show the positional relationship between the camera unit 4 and the upper case 2A on the lower body 2 side when the camera unit 4 is built into the upper case 2A.

The camera unit 4 is equipped with a camera joint plate 11 on the side surface in the direction of the rotation axis, and is equipped with a flange 4A on the other side. The upper case 2A is equipped with a first support 19A for supporting the camera joint plate 11 and a second support 19B for supporting the flange 4A.

The camera joint plate 11 is a circular plate mounted so as to be rotatable on the rotation axis of the camera unit 4, and is equipped with a nick 11B. A plate support 19C is formed on the first support 19A to be engaged with the camera joint plate 11, and a protrusion 19D is formed on it to be engaged with the nick 11B and to position the camera joint plate 11. Further, a flange support 19E is formed on the second support 19B for supporting the flange 4A.

The camera joint plate 11 is engaged with the plate support 19C, and the flange 4A is engaged with the flange support 19E, whereby the upper case 2A rotatably supports the camera unit 4.

A camera flexible board 13 is provided for the camera unit 4. The camera flexible board 13 is wound one round or more around the cylindrical portion of the second joint 6A of the second frame 6, and is then electrically connected to the circuit board 10 in the lower body 2. The reason for winding the camera flexible board 13 one round or more will be described below.

For the following description, the angles the camera unit 4 assumes will be defined as follows. When the camera unit 4 is perpendicular to the upper body 1 and is directed to the user side, the camera unit is at an angle of 90 degrees, and, when the camera unit 4 is perpendicular to the upper body 1 and directed in a direction opposite to the user, the camera unit is at an angle of 270 degrees. When the angle of the camera unit 4 is 0 degrees, the photographing direction is directed toward the interior of the lower body 2, and the photographing direction is completely covered with the case.

In this mobile electronic device, the rotation range for the camera unit 4 is restricted to the range of 0 to 270 degrees, whereby an excessive load on the camera flexible board 13, such as bending or expansion is suppressed.

Figure 10A:
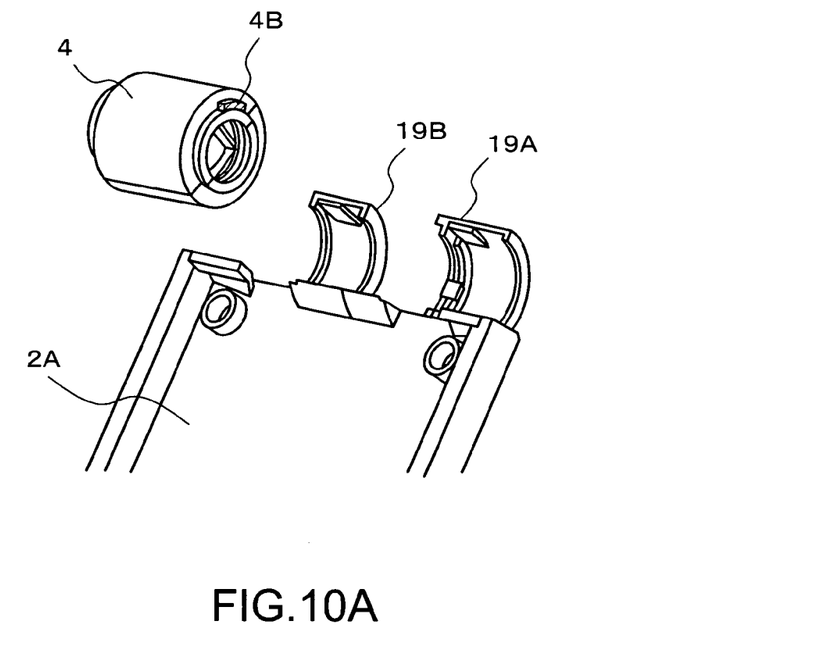
FIG. 10A is a perspective view with a camera joint plate omitted so that a protrusion of the camera unit may be visible.
Figure 10B:
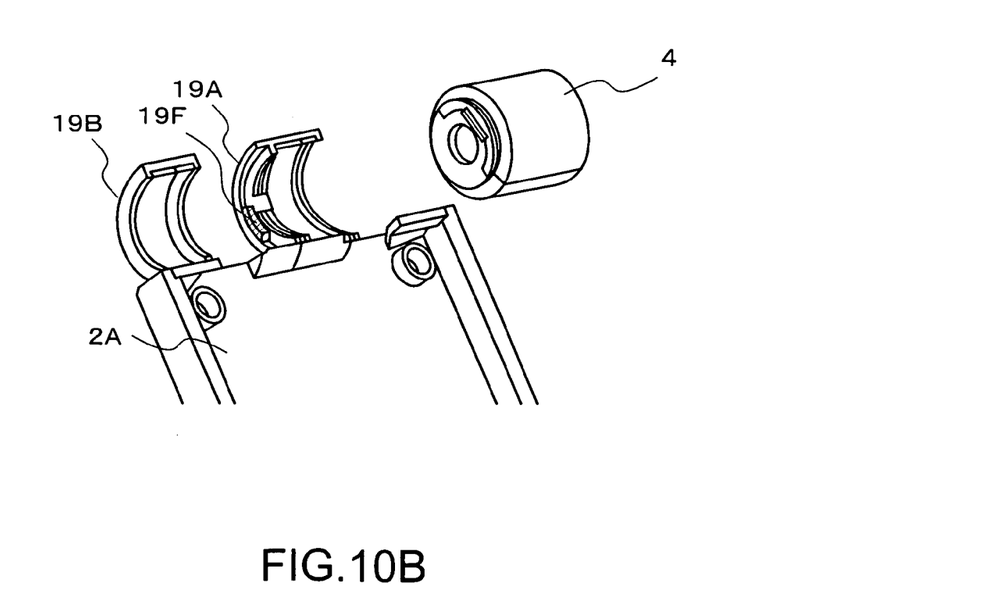
FIG. 10B is a perspective view showing the same thing as FIG. 10A as seen in the laterally opposite direction.
Figure 11A:
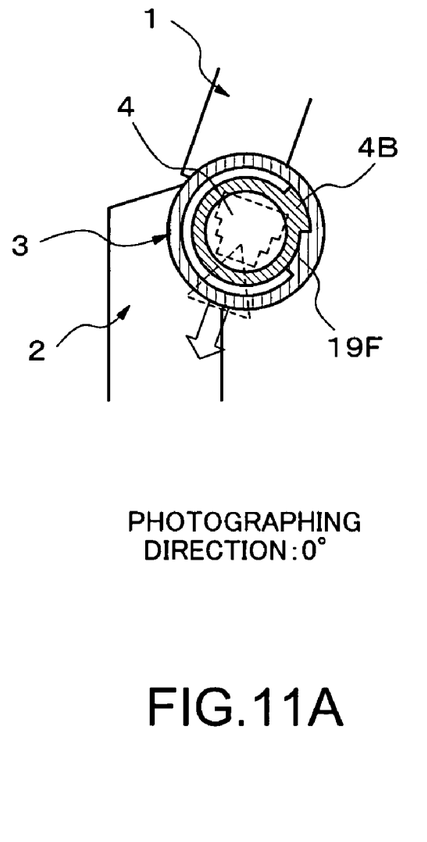
FIG. 11A is a see-through view showing the positions of the two protrusions when the photographing direction is 0 degrees.
Figure 11B:
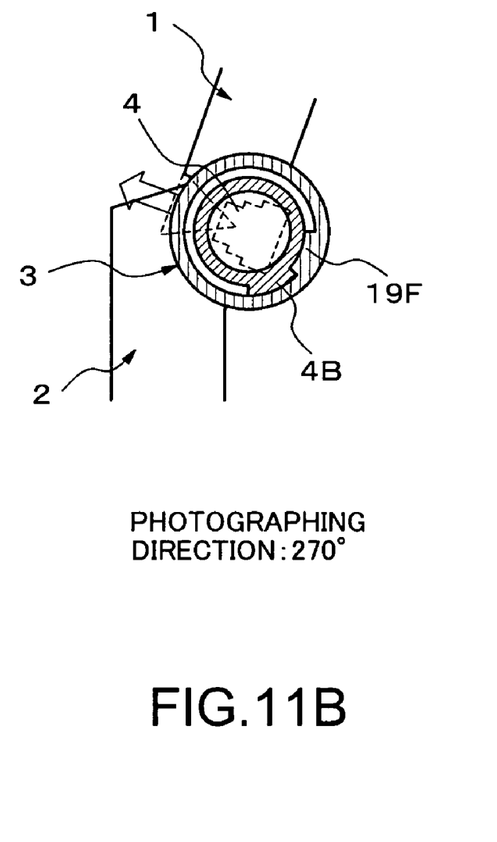
FIG. 11B is a see-through view showing the positions of the two protrusions when the photographing direction is 270 degrees.

The construction for restricting the rotation range for the camera unit 4 will be described. As described above, the camera unit 4 is equipped with a mechanism for restricting the rotation range to 0 to 270 degrees. That is, as shown in FIGS. 10A and 10B, the camera unit 4 has a protrusion 4B on the side of the camera joint plate 11, and the plate support 19C of the first support 19A is equipped with a protrusion 19F. Both the protrusion 4B and the protrusion 19F are of a fan-shaped configuration at an angle of 45 degrees around the rotation axis of the camera unit 4. And, the protrusions 4B and 19F are arranged such that the side surfaces of the protrusions 4B and 19F come into contact with each other when the angle of the camera unit 4 is 0 degrees (FIG. 11A). As long as the angle of the camera unit 4 remains within the range of 0 to 270 degrees, the protrusions 4B and 19F do not come into contact with each other. When the angle is 270 degrees, the side surfaces of the protrusions 4B and 19F come into contact with each other, thereby preventing rotation by an angle larger than 270 degrees (FIG. 11B). Due to the above construction, the rotation range for the camera unit 4 is restricted to 0 to 270 degrees.

While in the above description the rotation range for the camera unit 4 is restricted to 0 to 270 degrees, this should not be construed restrictively. It is also possible to restrict the rotation range to a range different from the above one if it includes an angle necessary for photographing by the camera. It is easily understood that; to change the restriction of the rotation range, the position of the protrusion 4B or protrusion 19F, or one or both of the central angle of the fans-shaped portions may be changed.

Next, the behavior of the camera flexible board 13 when the camera unit 4 rotates will be described. As stated above, the camera flexible board 13 is wound one round or more around the cylindrical portion of the second joint 6A within the hinge portion 3 before being connected to the circuit board 10 in the lower body 2. Since the camera flexible board 13 is connected to the circuit board 10, when the camera unit 4 rotates, the length of the portion of the camera flexible board 13 wound around the second joint 6A changes. This change in the length of the wound portion is absorbed by an increase and decrease in the winding diameter around respect to the second joint 6A. The principle on which the change in length is absorbed by an increase and decrease in the winding diameter is the same as that described with reference to FIGS. 6A and 6B.

The camera unit 4 is equipped with such basic components as those with which an ordinary camera is equipped, and there are no particular limitations regarding its functions and performance. That is, it is equipped with an optical system, such as a lens, a mechanical system for auto focus control, and electric components, such as an image sensor like a CCD or CMOS. And, the electric system and the circuit board 10 are connected by the flexible board 12. The above-mentioned components inside the camera unit 4 and the operation thereof are not directly related to the gist of the present invention, so that a description thereof will be omitted.

Finally, the advantages of this embodiment will be described.

In the hinge portion 3 of this embodiment, the first frame 5 and the second frame 6 formed of a high rigidity formation material are respectively built into the upper body 1 and the lower body 2 to thereby enhance the rigidity of the hinge portion 3, making it possible to prevent detachment and damage of the camera unit 4 arranged at the center of the hinge portion 3.

In this embodiment, the hinge shaft 7, which is used at either end in an ordinary hinge portion 3, is only used in the hinge joint 3A on one side. In the other hinge joint 3B, the hollow component 8 is used, through which the flexible board 12 is passed. As a result, the space at the center of the hinge portion 3, that is, the space between the hinge joint 3A and the hinge joint 3B is increased, thus securing the space for the camera unit 4.

At this time, due to the use of the hinge shaft 7 in the joint 3A only, a load larger than usual is applied to the portion retaining the hinge shaft 7. However, the first joint 5A and the second joint 6A retaining the hinge shaft 7 are formed integrally with the first frame 5 and the second frame 6 of high rigidity, so that the portion retaining the hinge shaft 7 has a sufficient strength.

Further, in this embodiment, when the folding electronic apparatus is in the intermediate state, the flexible board 12 is flat within the hinge joint 3B. Since the support portion 16 of the flexible board 12 is supported by the slit 8A, the flexible board is bent solely at the curving portion 17 in opposite directions in the open state and the closed state. As a result, the length of the portion of the flexible board 12 to be curved is minimized, making it possible to reduce the change in the length of the portion of the flexible board 12 to be curved between the open state and the closed state. Thus, there is no need to form the ring-shaped curving portion 15 for absorbing the change in the length of the portion of the flexible board 12 to be curved as in the case of FIG. 5. Thus, it is possible to further reduce the inner diameter of the hinge joint 3B, thereby achieving a reduction in the size of the device.

Since no ring-shaped curving portion 15 is formed in the flexible board 12, it is possible to reduce the length of the flexible board 12, which is also advantageous in terms of cost. Further, as shown in FIG. 5, there is no need either to secure a space for the curving portion 15 of the flexible board 12 with a size not smaller than that in the case the ring diameter is maximum.

When built into the device, the camera flexible board 13 is wound one round or more around the second joint 6A of the second frame 6. By increasing the number of rounds that the flexible board is wound, the proportion of the length of the curving portion of the camera flexible board 13 with respect to the total length of the camera flexible board 13 is reduced. Thus, it is possible to diminish the fluctuation in the diameter of the wound portion of the camera flexible board 13, whereby it is possible to minimize the inner diameter of the hinge portion 3.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

What is claimed is:

1. A folding electronic device comprising:
   a first frame equipped with plural first joints;
   a second frame equipped with plural second joints;
   plural sets of hinge joints in which said plural first joints and said plural second joints are connected together in a manner that said first frame and said second frame can rotate on a predetermined rotation axis;
   a first body containing said first frame; and
   a second body containing said second frame;
   wherein at least one set of hinge joints of said plural sets of hinge joints are equipped with a connecting component having a hollow portion,
   wherein the other sets of hinge joints are equipped with predetermined solid hinge shafts,
   wherein said first body has a display device,
   wherein said second body has a circuit board for driving said display device,
   wherein a flexible board disposed between said display device and said circuit board passes through said hollow portion,
   wherein said connecting component has, in a side of said hollow portion, a slit for allowing passage of said flexible board,
   wherein in an intermediate state that is between an open state where the angle made by said first frame and said second frame, connected together by means of said hinge joints, is maximum, and a closed state where the angle is minimum, said flexible board is arranged to be flat in said hollow portion,
   wherein said flexible board is supported by surfaces on both sides of said slit so as to be flat in the open state and in the closed state, and
   wherein the connecting component having the hollow portion with the slit has a circular-shaped first region and a linear-shaped second region in which the slit and the both sides of the slit are disposed.

2. A folding electronic device according to claim 1, wherein said hinge joints are equipped with a predetermined space generated between said first joint and said second joint for connecting said first joints and said second joints while sliding said first joints and said second joints in the direction of said predetermined rotation axis, and a spacer, which is inserted into said predetermined space.

3. A folding electronic device according to claim 2, wherein the spacer is formed in a C-shape so as to be assembled to rotate along said predetermined rotation axis after the spacer is inserted into one set of said hinge joints.

4. A folding electronic device according to claim 2, wherein the spacer is formed in a ring-shape so as to rotate along said predetermined rotation axis.

5. A folding electronic device according to claim 1, further comprising a camera unit supported to allow rotation between two adjacent hinge joint sets of said plural hinge joint sets,
   wherein said camera unit is equipped with camera wiring, which is connected to said circuit board after making one round or more.

6. A folding electronic device according to claim 5, wherein for restricting the rotation angle of said camera unit to a predetermined range, said camera unit is equipped with a predetermined protrusion on a side surface of said camera unit and said hinge joint supporting said camera unit has a predetermined protrusion on said hinge joint.

7. A folding electronic device according to claim 6, wherein said hinge joints are equipped with a predetermined space generated between said first joint and said second joint for connecting said first joints and said second joints while sliding said first joints and said second joints in the direction of said predetermined rotation axis, and a spacer, which is inserted into said predetermined space.

8. A folding electronic device according to claim 6, wherein the predetermined range corresponding to the rotation angle of said camera unit is restricted to between 0 degrees and 270 degrees.

9. A folding electronic device according to claim 6, wherein restriction of the rotation angle of said camera unit to the predetermined range is accomplished by a side surface of the predetermined protrusion on the side surface of said camera unit coming into contact with a side surface of the predetermined protrusion on said hinge joint supporting said camera unit.

10. A folding electronic device according to claim 5, wherein said hinge joints are equipped with a predetermined space generated between said first joint and said second joint for connecting said first joints and said second joints while sliding said first joints and said second joints in the direction of said predetermined rotation axis, and a spacer, which is inserted into said predetermined space.

11. A folding electronic device according to claim 1, wherein said first frame and said second frame are made of a high rigidity formation material.

12. A folding electronic device according to claim 1, further comprising:
   a camera unit supported to allow rotation between two adjacent hinge joint sets of said plural hinge joint sets.

13. A folding electronic device according to claim 12, wherein said camera unit is equipped with camera wiring, which is connected to said circuit board after making one round or more around one of the sets of hinge joints.

14. A folding electronic device according to claim 1, wherein the camera wiring comprises a flexible board that makes two or more rounds around the one of the sets of hinge joints.

15. A folding electronic device according to claim 1, wherein a curving portion of said flexible board in the open state is arranged to be bent to an opposite side from a side of the curving portion in the closed state.

16. A folding electronic device according to claim 15, wherein a support portion of said flexible board is supported by the surfaces so as not to be curved and is curved only at the curving portion.

* * * * *